July 8, 1941.                D. DANIELS                2,248,218
                         GOVERNED WINDMILL WHEEL
                           Filed April 24, 1939

INVENTOR:
DAVID DANIELS,
BY:
Christian R. Nielsen
ATTORNEY

Patented July 8, 1941

2,248,218

UNITED STATES PATENT OFFICE 2,248,218

GOVERNED WINDMILL WHEEL

David Daniels, Newark, N. J.

Application April 24, 1939, Serial No. 269,755

1 Claim. (Cl. 170—68)

This invention relates to automatic means for regulating the speed of rotation of windmill wheels employed in the generation of electricity, particularly, although adaptable to use in control of windmill wheels generally, and it consists in the constructions, arrangements and combinations herein described and claimed.

It is an object of the invention to provide means for automatically feathering the blades of a windmill wheel when the rotation of the wheel attains a given speed.

It is also an object of the invention to provide means of the character described in which the setting of the blades is effected through centrifugal action of weight means associated with shafts of respective blades.

It is a still further object of the invention to provide a device of the character described in which the essential operative parts are enclosed against elements of weather, and in which the operative parts are smooth and positive in operation.

Additional objects, advantages and features of invention will be apparent from the following description and accompanying drawing, wherein—

Figure 1 is a front elevation of the governor, with the cover plate removed.

Figure 2 is a vertical section therethrough.

Figure 3 is an elevation of a wind wheel and governor constructed in accordance with the invention.

Attention is first invited to Figure 3 of the drawing, wherein there is shown a tower 10 upon the upper end of which there is shown generally a generator 11 having a shaft 12 rotatably mounted in a bracket 13, of the tower 10. The bracket 13 is an integral part of a head 14 which is rotatable to present the wind wheel 15 in proper position to the wind by reason of a tail vane 16, all of which is generally understood.

Attention is now directed to Figures 1 and 2 of the drawing, for an understanding of the construction and operation of the governor. A drum-like casing 17 is provided, having a central hub 18, an annular flange 19 and a rear wall 20, the latter being formed integrally with the hub and flange, as clearly shown in Figure 2. The hub 18 has a central aperture for reception of the shaft 12 of the generator, and may employ any convenient means of keying the hub thereto so that the wheel 15 may rotate therewith.

The hub 18 has an axial recess 21 providing an annular rim 22 and at diametrically opposite points the rim is provided with bores aligned with similarly positioned bores formed in the rim 19. In each of the aligned bores of the hub 18 and the rim 19 there is revolubly journalled a shaft 23. Each of the shafts 23 is secured to the hub 18 by a nut 24 as shown, or other means may be employed. Upon each shaft 23 there is fixed a bevelled gear 25 in mesh with a similar gear 26 fixed to a stud shaft 27 revolubly mounted in the wall 20 of the drum. Fixedly engaged with each gear 26 and shaft 27 there is a cross arm 28, the latter extending diagonally across the shaft 23, one end 30 of which anchors a short spring 29 by means of a pintle 31 fixed in the wall 20. The pintle 31 is positioned to one side of the shaft 23 and at a height approximately in line with the end 31 of the lever. To the other end 32 of the lever 28 a longer helical spring 33 is secured, being also anchored to the respective pintle 31. Obviously, by providing springs as shown, the blades 34 associated with respective shafts 23 will be held in normal operative position to drive the generator at a proper charging speed, and in order that such speed will not be increased during high winds or storms, I provide a centrifugally operated means for feathering the blades, as will now be described.

Upon each of the stud shafts 27 outwardly of the wall 20 there is fixed an arm 35, upon the outer end of which there is mounted a weight 36. Under normal rotation of the wind wheel, the arms 35 maintain the position shown in solid lines in Figure 1, but upon acceleration of the wheel, the arms 35 will be thrown outwardly as indicated by dotted lines due to centrifugal force. When such movement of the arms occurs, the stud shaft 27 will be rotated, as will the gear 26, and since the gear 25 is in mesh therewith, the blade shaft 23 is also rotated, and this in a direction to turn the blade edgewise to the wind, thus lessening the torque of wind pressure on the blade, with consequent reduction of speed to the wind wheel. Upon cessation of the wind, the springs 29 and 33 will return the parts to normal position.

Preferably the casing 17 will include a cone shaped closure head 37, bolted or otherwise secured to the wall 19, to protect the mechanism from the weather.

It should be noted that the gears 25—26 only make partial rotations, and therefore it will be practical to readjust the gears when they become worn. Any suitable lubrication means may be employed, none being shown in the present instance, since this will be quite apparent.

While I have shown and described a preferred construction, this is by way of illustration only, and I consider as my own all such modifications as fairly fall within the scope of the appended claim.

I claim:

In a feathering wind wheel, an annular casing having a back wall and a circumscribing annular wall, said back wall having a concentric hollow hub, the annular wall and the hub having aligned apertures, a shaft revolubly journaled in each pair of aligned apertures, a propeller blade on each shaft, exteriorly of the annular wall, a bevelled gear on each shaft, stud shafts oscillatably mounted in the back wall of the casing, and at right angles to the first named shaft, there being one for each propeller shaft, a bevelled gear on each stud shaft in mesh with respective gears of the propeller shafts, a cross arm fixed to each stud shaft and having opposed end portions, a tension spring connected to the end portions of the cross arms, the other end of each spring being anchored to the back wall of the casing for maintaining the propeller shafts in normal position, an arm connected to each stud shaft exteriorly of the casing, and weight means on each of the arms for effecting rotation of the stud shafts and propeller shafts.

DAVID DANIELS.